US007606899B2

(12) United States Patent
Martin et al.

(10) Patent No.: US 7,606,899 B2
(45) Date of Patent: Oct. 20, 2009

(54) REGULATING ACCESS TO A SCARCE RESOURCE

(75) Inventors: Sean James Martin, Boston, MA (US); Chetan Ram Murthy, Boston, MA (US); Andrew James Stanford-Clark, Chale (GB)

(73) Assignee: International Business Machines Corporation, Armonk, NY (US)

(*) Notice: Subject to any disclaimer, the term of this patent is extended or adjusted under 35 U.S.C. 154(b) by 660 days.

(21) Appl. No.: 09/916,792

(22) Filed: Jul. 27, 2001

(65) Prior Publication Data

US 2003/0023724 A1 Jan. 30, 2003

(51) Int. Cl.
*G06F 15/173* (2006.01)

(52) U.S. Cl. .................................................... 709/225

(58) Field of Classification Search ................ 709/225, 709/226, 228, 229
See application file for complete search history.

(56) References Cited

U.S. PATENT DOCUMENTS

| | | | | |
|---|---|---|---|---|
| 5,982,780 | A * | 11/1999 | Bohm et al. | 370/450 |
| 6,011,537 | A * | 1/2000 | Slotznick | 345/733 |
| 6,094,677 | A | 7/2000 | Capek et al. | |
| 6,330,719 | B1 * | 12/2001 | Zigmond et al. | 725/121 |
| 6,338,089 | B1 * | 1/2002 | Quinlan | 709/227 |
| 6,389,028 | B1 * | 5/2002 | Bondarenko et al. | 370/401 |
| 6,415,027 | B1 * | 7/2002 | Malik | 379/221.01 |
| 6,463,457 | B1 | 10/2002 | Armentrout et al. | |
| 6,584,097 | B1 * | 6/2003 | Malik | 370/352 |
| 6,606,661 | B1 * | 8/2003 | Agrawal et al. | 709/227 |
| 6,714,536 | B1 * | 3/2004 | Dowling | 370/356 |
| 6,724,764 | B2 | 4/2004 | Bondarenko et al. | |
| 6,801,906 | B1 * | 10/2004 | Bates et al. | 707/3 |
| 6,820,260 | B1 | 11/2004 | Flockhart et al. | |
| 6,823,392 | B2 * | 11/2004 | Cherkasova et al. | 709/229 |
| 6,832,255 | B1 * | 12/2004 | Rumsewicz et al. | 709/227 |
| 6,859,834 | B1 * | 2/2005 | Arora et al. | 709/227 |
| 6,990,525 | B1 * | 1/2006 | Ying et al. | 709/227 |
| 6,993,559 | B2 | 1/2006 | Jilk, Jr. et al. | |
| 7,269,637 | B2 * | 9/2007 | Kubo | 709/219 |
| 7,477,659 | B1 | 1/2009 | Nee et al. | |
| 7,483,964 | B1 * | 1/2009 | Jackson et al. | 709/221 |
| 2002/0004833 | A1 * | 1/2002 | Tonouchi | 709/229 |
| 2002/0053029 | A1 * | 5/2002 | Nakamura et al. | 713/201 |
| 2002/0059436 | A1 * | 5/2002 | Kubo | 709/229 |
| 2002/0083342 | A1 * | 6/2002 | Webb et al. | 713/201 |
| 2002/0133593 | A1 * | 9/2002 | Johnson et al. | 709/226 |
| 2002/0194251 | A1 * | 12/2002 | Richter et al. | 709/105 |

OTHER PUBLICATIONS

Martin et al., U.S. Appl. No. 09/917,536, Filed: Jul. 27, 2001, Office Action Summary, Sep. 29, 2004, 8 pages.

(Continued)

*Primary Examiner*—Douglas B Blair
(74) *Attorney, Agent, or Firm*—Hoffman Warnick LLC

(57) ABSTRACT

The invention relates to regulating access by users to a scarce resource. A request for access to the scarce resource is received. It is determined whether the access level for the scarce resource is at a desired maximum and responsive to determining that it is, the requester is allocated to an access slot. The requester is then provided with a notification of their allocated access slot. Access is available to the requester when the allocated slot is enabled.

37 Claims, 8 Drawing Sheets

OTHER PUBLICATIONS

Martin et al., U.S. Appl. No. 09/917,536, Filed: Jul. 27, 2001, Office Action Summary, Mar. 1, 2005, 6 pages.
Martin et al., U.S. Appl. No. 09/917,536, Filed: Jul. 27, 2001, Office Action Summary, Sep. 8, 2005, 7 pages.
Martin et al., U.S. Appl. No. 09/917,536, Filed: Jul. 27, 2001, Office Action Summary, Jan. 24, 2006, 6 pages.
Martin et al., U.S. Appl. No. 09/917,536, Filed: Jul. 27, 2001, Office Action Summary, Oct. 18, 2007, 10 pages.
Martin et al., U.S. Appl. No. 09/917,536, Filed: Jul. 27, 2001, Office Action Summary, May 28, 2008, 12 pages.
Martin et al., U.S. Appl. No. 09/917,536, Filed: Jul. 27, 2001, Notice of Allowance and Fee(s) Due, Mar. 11, 2009, 5 pages.

* cited by examiner

| Current Time: | Allotted Slot: | Remaining Time: |
|---|---|---|
| 11:00 | 11:30 - 11:45 | 30 minutes |

Figure 4

REGULATING ACCESS TO A SCARCE RESOURCE

RELATED APPLICATION

This patent application is related to co-pending U.S. patent application Ser. No. 09/916,792 which is being filed on the same day.

FIELD OF THE INVENTION

The present invention relates to regulating user access to a scarce resource (e.g. the whole or part of a frequently accessed application or web site).

DESCRIPTION OF THE RELATED ART

In any distributed client-server environment, client's (users; or client applications) typically compete for access to applications running at a server. As more and more clients try to access an application or a part(s) thereof, the processing load/the load on other limited resource such as memory; disk; I/O bandwidth etc. increases. This is especially true if frequent accesses to one part of the application is particularly processor; resource; memory; I/O etc. intensive. Performance therefore typically degrades as the server struggles to cope with the load. Since users are frequently unforgiving, this is a worrying situation for the owner of such a server, or indeed the owner of a popular application. If response times become too poor, then users will invariably take their business elsewhere.

Some companies have addressed the problem by increasing server capacity. They have replaced old and struggling machines with bigger and better ones. This is however costly and in any case, it is difficult to keep pace.

One environment of particular concern is the World Wide Web. Probably the biggest problem facing e-commerce web sites today, is that if an online attraction (e.g. a shop) proves very popular and the server hosting the site approaches maximum capacity, there is no satisfactory means of limiting the flow of customers into the site. This often results in a degraded browsing/shopping experience for people already on the site, and in extreme cases will lead to the overload and failure of the site.

As alluded to above, in some situations access to the majority of the site may not be a problem. Rather access to a particular part (e.g. the checkout at a shopping site) may be especially processor; resource; memory; I/O etc. intensive thereby degrading the experience for others accessing that part or indeed accessing the whole site.

Such an experience will typically cause customers to become frustrated. They will often go straight to a competitor's web site.

U.S. Pat. No. 6,154,769 discloses a partial solution to the problem. It teaches queuing of access to a web server. Whilst this effectively limits the number of users able to gain access to the server, it moves the frustration factor away from the users navigating a site and onto the users queuing for access. Typically a user's system (client) just hangs until access is granted.

SUMMARY OF THE INVENTION

Accordingly the invention provides a method for regulating access by users to a scarce resource, the method comprising the steps of: receiving a request for access to the scarce resource; determining whether the access level for said scarce resource is at a desired maximum; responsive to determining that said access level is at a desired maximum, allocating an access slot to said requester; and providing said requester with a notification of their allocated access slot, access being available to said requester when said allocated slot is enabled.

Thus the number of users accessing the scarce resource is controlled and performance is therefore maintained at an acceptable level. Users' frustration at poor response times is mitigated and they are less likely to take their business elsewhere.

In a preferred embodiment the requester is notified of their allocated access slot by being issued with a ticket comprising access slot information. Preferably at least a part of the access slot information is used by the requester to determine when the allocated slot is enabled.

In one embodiment the ticket has a start time for the access slot and also an expiry time. However the invention is not limited to such. For example, the requester may instead be informed of the amount of time remaining until their access slot is enabled. This is useful for those requesters/clients (primitive clients) which do not have a system clock and are not therefore capable of determining the current time. As long as the primitive clients are capable of counting up/down (or at least measuring the passage of time reasonably accurately), they will be able to determine when their access slot has arrived.

By informing clients of their access slot, it is possible for them to track their progress. This is much less frustrating than the prior art methods which typically hang a user's system until access can be granted. Such requesters/users are now much more likely to persevere than to divert their attention to a competitor's scarce resource.

Of course a client application may be requesting the access without any human intervention. In which case, the application is able to get on with other tasks whilst it waits for its access slot to arrive.

In order to encourage a user's continued attention, the requester may be provided with entertainment whilst they wait for their access slot to be enabled. (The entertainment may be remote and this is particularly useful if the entertainment is processor; resource; memory; I/O etc. intensive.)

Such entertainment may include adverts; online gaming etc. It prevents boredom from setting in and is also perfect for creating additional buy opportunities. For example, if the scarce resource is an internet shop checkout, then the shop can provide the requester with their own promotional offers.

In one embodiment an executable program is downloaded onto the requester's computer in order to prevent the requester from attempting to access the scarce resource until their access slot has been enabled. The invention is particularly applicable (although not limited to) accessing a scarce resource in a web-based environment, in which case the executable program may be a Java applet (Java is a trademark of Sun Microsystems Inc.); a COM object; a piece of javascript (all of which are typically executable program within an internet browser). Alternatively a separate application may be downloaded onto the requester's computer. Java applets; COM objects and javascript programs typically do not store any persistent state, in the sense that once a web page containing them is disconnected, the information gathered from a user session is lost. Once a web page containing them is disconnected, the information gathered from a user session is lost. Thus if the requester is denied access to the scarce resource and decides to browse other parts of the web whilst they await their access slot, then they will typically need to be issued with a new slot upon returning to the web site hosting the resource. (Those tasks which aren't web based may naturally be continued with a web session connected to the page hosting the applet running in the background.) The advantage of using a separate application is that this application can be receiving and displaying information in the background whilst the requester browses other web sites. This is of course useful when it is a client application requesting access to the scarce resource with no human intervention, as well as when it is a human requesting access. The client application may continue with other tasks whilst it waits. (of course it is still possible to continue browsing other web sites when using an applet because a new browser session may be opened for this purpose.)

According to the preferred embodiment, responsive to the requester re-requesting access to the scarce resource, it is determined whether the access slot is enabled. Responsive to determining that the access slot is enabled, access is granted.

In the web environment, a re-request could be initiated by prompting the requester to hit the browser "reload" button. Alternatively this may be achieved by some javascript running within a web page from which access can be requested. As another alternative a HTML client refresh tag could be used to prompt a request every N seconds. These are by way of example only. In one embodiment it is the executable program that re-requests access at the appropriate moment.

In one embodiment a re-request presents a ticket issued to the requester upon the first request. This ticket may be stored with the requester as a client-side browser cookie in which case the requester is free to browse other internet sites etc. until their access slot becomes available. (Of course the requester may want to open a new browser window to do so, in order that a refresh does not interrupt their browsing). The ticket denotes access slot information (e.g. an access slot start time and an access slot expiry time). The presented ticket is preferably used to determine whether access is available to the requester.

Note, the re-request may not involve a direct hit on the scarce resource. In one embodiment, the step of granting access comprises diverting said requester to a first server hosting said scarce resource. Responsive to determining that access is not available, the request is diverted to a second server. The second server may provide the requester with entertainment whilst waiting for said access slot to be enabled. It is particularly advantageous to filter requests in this way because continuous requests (from the same or different clients) for access to the first server could severely impact server performance. The filtering avoids this.

In one embodiment, in order to determine whether the access level for the scarce resource is at a desired maximum, the number of users currently accessing the scarce resource is tracked. This number is then compared with a predetermined maximum value.

In one embodiment a late request for access to the scarce resource is received from the requester having missed access when available. It is then determined whether the scarce resource is able to accommodate access by the late requester and responsive to determining that it is possible to accommodate access, granting access thereto. Preferably this access is granted by issuing a ticket to said requester which is valid for the next access slot. Of course the issuer may be allocated to a later slot if access cannot be granted immediately.

Whilst there is a desired maximum access level, it will be appreciated that performance may not be degraded too much by allowing the odd latecomer access. Such flexibility only adds to user satisfaction.

In one embodiment the average time spent accessing the scarce resource is determined. The length of subsequent access slots are then determined based on the average time.

In one embodiment it is determined that the requester's slot is at an end and access to the scarce resource is refused. In the web environment access to the scarce resource will typically comprise a series of interactions, each interaction loading a new web page. Each time a web page is requested a check is preferably done to determine when the user's access slot is still valid. Of course an executable program at the client-side may equally not permit any additional requests after the requester's access slot has expired.

In one embodiment it is determined that the requester's access slot is at an end but that they have not finished accessing the scarce resource. It is then determined whether the scarce resource is able to accommodate continued access by the requester and assuming that this is so, then continued access is granted.

There may be a number of reasons why it is possible to accommodate continued access by the requester. In one embodiment, the scarce resource comprises a chain of resources. For example a shop may consist of two scarce resources: a shopping basket which may be added to; and a checkout for processing of shopping and payment. It will be appreciated that navigation of the departments and creation of a shopping basket is likely to take much longer than the checkout stage. Thus in one embodiment, initial access by a client should preferably be within the access slot allocated to that client. However if it is determined at the expiry of their access slot that the requester is at the checkout, then they may be allowed to finish their transaction during the next time slot window since such access will typically be quick. (The transaction is thus able to complete and this is of mutual benefit to the shopper and the shop owner.) Equally, some of the resources in the chain may be more processor; resource; memory; I/O etc. intensive than others. Thus if the less processor; resource; memory; I/O etc. intensive resources are at the end of the chain, then clients accessing these may be allowed continued access even after their slot has expired. Further, if it is determined that the requester has almost finished accessing the scarce resource/a resource in the chain, then they may be allowed to continue with their access. By way of example, the interactions with the scarce resource are used to determine where the requester is in accessing the scarce resource.

In one embodiment, a request is received for access to the scarce resource. Responsive to determining that the requester previously opted to leave the scarce resource early, it is determined whether the scarce resource can re-accommodate access by the requester. Responsive to determining that the scarce resource can re-accommodate access, the requester is granted access to the scarce resource.

In one embodiment, each client's ticket is marked (i.e. clipped) upon actual entry/access to the initial scarce resource. The client keeps a tally of the client interactions with each resource in the chain and if they decide to leave the chain behind them (i.e. not to continue accessing the scarce resource/chain of resources), stores all this information in a cookie. Thus if the client returns to the scarce resource after their allotted slot has expired, this information can be used to determine where they were in the chain. If, for example, it is determined that they were near the end of the chain/only had resources to access which weren't particularly processor; resource; memory; I/O etc. intensive, then they may be allowed continued access outside of their allotted slot.

In one embodiment, the access slot only applies to one of the resources in the chain and any other resource in the chain is accessible whether or not the user's slot is enabled. Thus for example only the first resource must be accessed within a user's slot and they may take as long as they wish over accessing subsequent resources.

In one embodiment only initial access is controlled. Thus the user is issued with a start time; or is informed of an amount of time remaining until access can be granted. They are not provided with any form of expiry time and may continue accessing the resource for as long as necessary. The strategy for this may, for example, be that the average access time can be determined and used when allocating subsequent start times.

According to another aspect, the invention provides an apparatus for regulating access by users to a scarce resource, the apparatus comprising: means for receiving a request for access to the scarce resource; means for determining whether the access level for said scarce resource is at a desired maximum; means, responsive to determining that said access level is at a desired maximum, for allocating an access slot to said requester; and means for providing said requester with a notification of their allocated access slot, access being available to said requester when said allocated slot is enabled.

According to yet another aspect, the invention provides a computer program comprising program code adapted to perform the steps of: receiving a request for access to the scarce resource; determining whether the access level for said scarce resource is at a desired maximum; responsive to determining that said access level is at a desired maximum, allocating said requester to an access slot; and providing said requester with a notification of their allocated access slot, access being available to said requester when said allocated slot is enabled.

According to another aspect, the invention provides a method for determining whether a user can be granted access to a scarce resource after an access slot allocated to said user has expired, the method comprising the steps of: tracking at least one interaction by said user associated with said scarce resource; responsive to an interaction, comprising a request, by said user for access to said scarce resource after the allocated access slot has expired, using at least one tracked interaction to determine whether the scarce resource can accommodate access by the user to the scarce resource; and responsive to determining that scarce resource can accommodate access, granting said access.

Note, an interaction "associated" with the scarce resource should be taken as encompassing actual access to the scarce resource, as well as requests for access to the scarce resource.

In one embodiment the request for access is a request for continued access. In other words the user is in the middle of accessing the resource when their slot expires and wishes to continue with their access. This request may be the only interaction tracked. Dependent upon what the user wishes to do/the interactions in progress by other users etc., it may be possible to accommodate continued access even after a user's access slot has expired. For similar reasons it may also be possible to accommodate a returning user (i.e. one who has left the scarce resource and returns outside of their expiry slot to complete their processing)—see below.

In one embodiment the scarce resource comprises a chain of resources. In this embodiment, the step of using at least one tracked interaction is to determine whether the scarce resource can accommodate access by the user to the scarce resource comprises determining the point reached by said user in the chain. The user may have left the scarce resource to do other tasks and then try to return to the scarce resource after their access slot has expired. It will be appreciated that this user will typically not need to access the resource at the beginning but will wish to continue access from where they left off. For example, if the user is near the end of the chain it may be determined that access can be accommodated. Users may tend to bunch at the beginning of the chain, but pass reasonably quickly through the last few resources. It is also possible in a shopping environment that a large number of people will enter the shop but that a reasonable proportion of these will never proceed all the way through to the checkout. Thus there is an exponential decay over time of the number of people in the chain. (Another example scarce resource is an online stately home having a number of rooms to visit. In this instance there might be bunching in the first room/few rooms, but people tend to spread out through the rooms as they proceed at different paces (thus naturally load balancing the resources in the chain). These are by way of example only and the invention is in no way limited to such. Note, the interaction information tracked may be tracked at a server associated with the scarce resource and then recorded in a cookie should the user opt to leave the scarce resource to return at a later date (the user may informs the user when they leave early such that this information can be stored; alternatively the cookie may be updated after each interaction by the user with the resource). The server may use interactions from other users to determine where those other users are in the chain and whether a particular user is permitted continued/returning access outside of their access slot.

According to another aspect, the invention provides apparatus for determining whether a user can be granted access to a scarce resource after an access slot allocated to said user has expired, the apparatus comprising: means for tracking at least one interaction by said user associated with said scarce resource; means, responsive to an interaction, comprising a request, by said user for access to said scarce resource after the allocated access slot has expired, for using at least one tracked interaction to determine whether the scarce resource can accommodate access by the user to the scarce resource; and means, responsive to determining that scarce resource can accommodate access, for granting said access.

According to another aspect, the invention provides a computer program for determining whether a user can be granted access to a scarce resource after an access slot allocated to said user has expired, said program comprising program code adapted to perform the steps of: tracking at least one interaction by said user associated with said scarce resource; responsive to an interaction, comprising a request, by said user for access to said scarce resource after the allocated access slot has expired, using at least one tracked interaction to determine whether the scarce resource can accommodate access by the user to the scarce resource; and responsive to determining that scarce resource can accommodate access, granting said access.

BRIEF DESCRIPTION OF THE DRAWINGS

Embodiments of the present invention will now be described, by way of example only, and with reference to the following drawings:

FIG. 4 shows a Java applet displayed to a user requesting access to a scarce resource in accordance with the first embodiment.

DETAILED DESCRIPTION OF THE PREFERRED EMBODIMENTS

Figure 1:
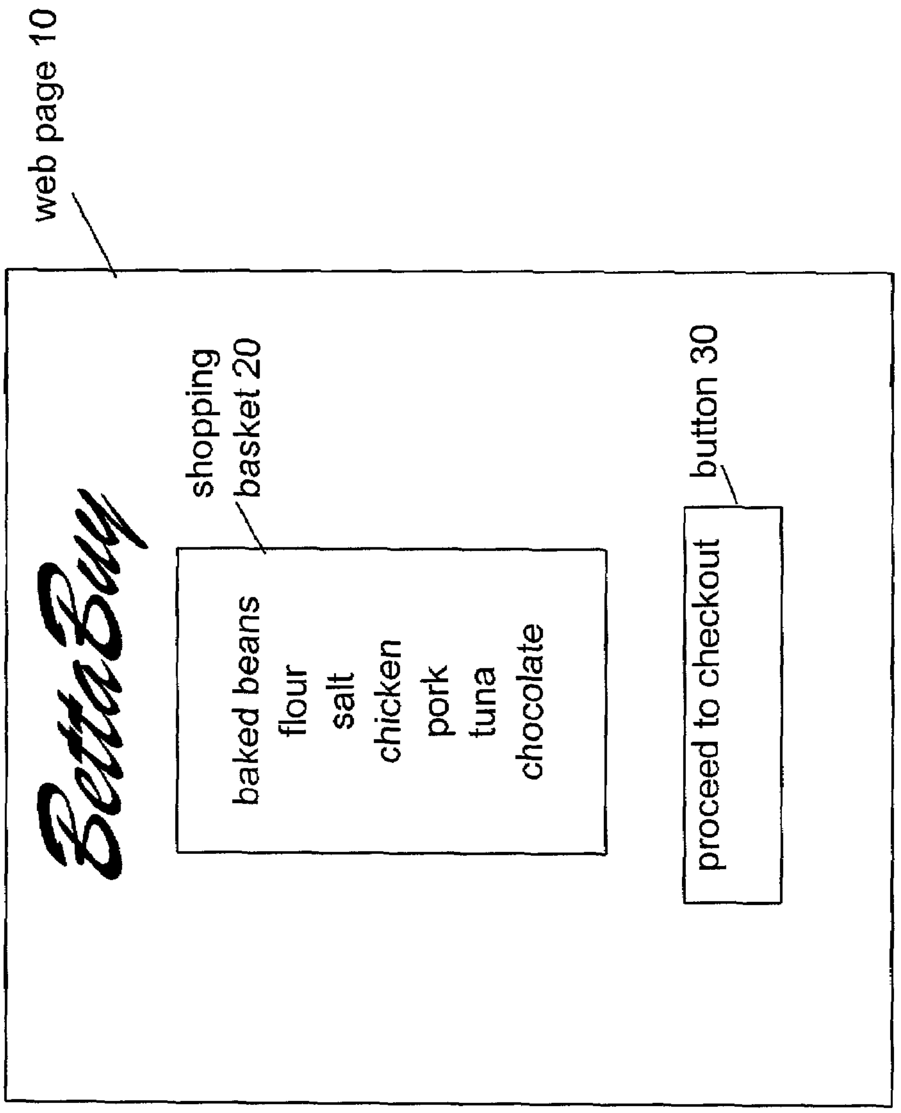
FIG. 1 shows a front-end to an example scarce resource in accordance with a preferred embodiment of the present invention.
Figure 2:
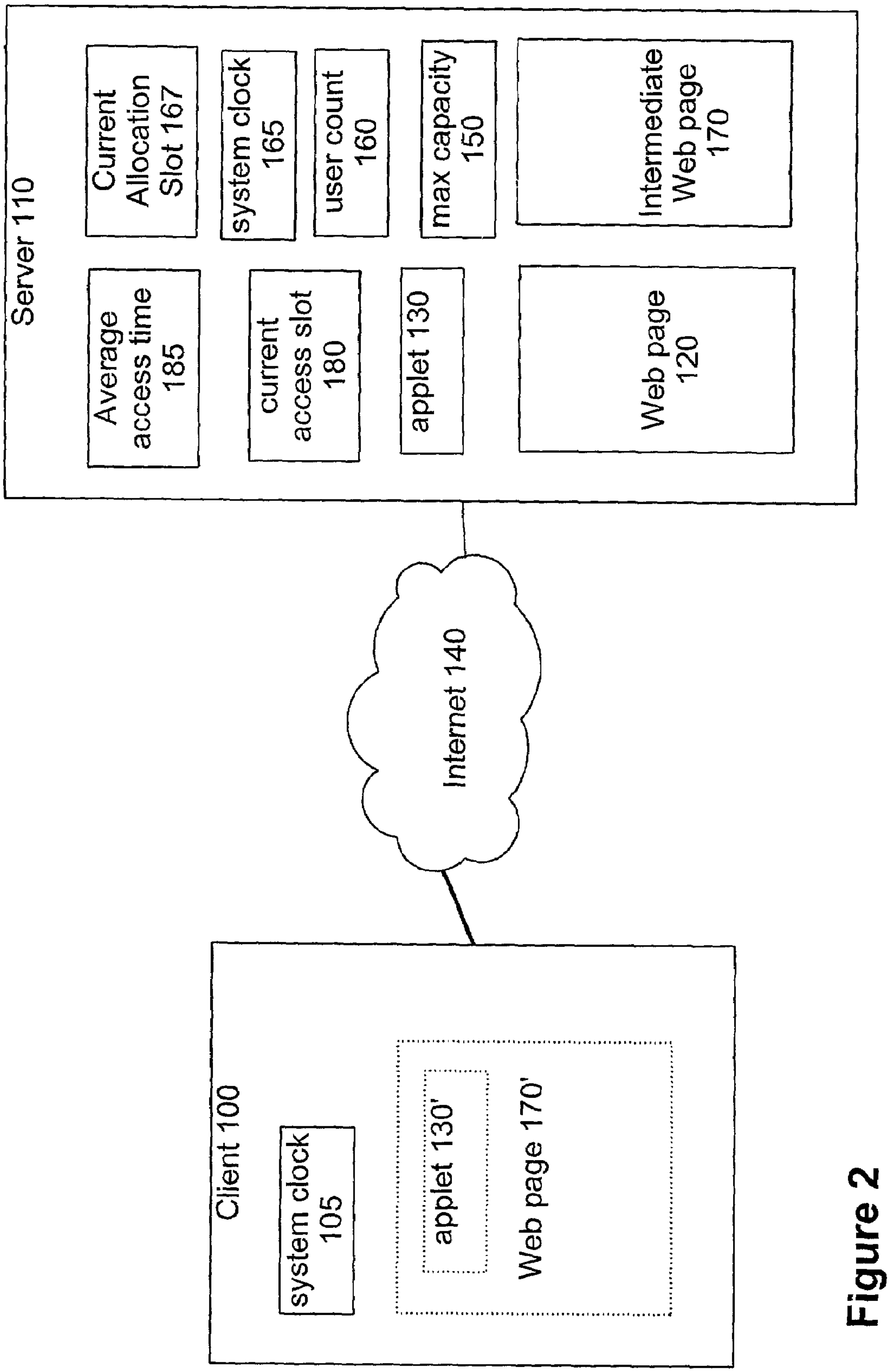
FIGS. 2, 3*a*, 3*b* and 3*c* illustrate web site access to a scarce resource according to a first embodiment of the present invention.
Figure 3A:
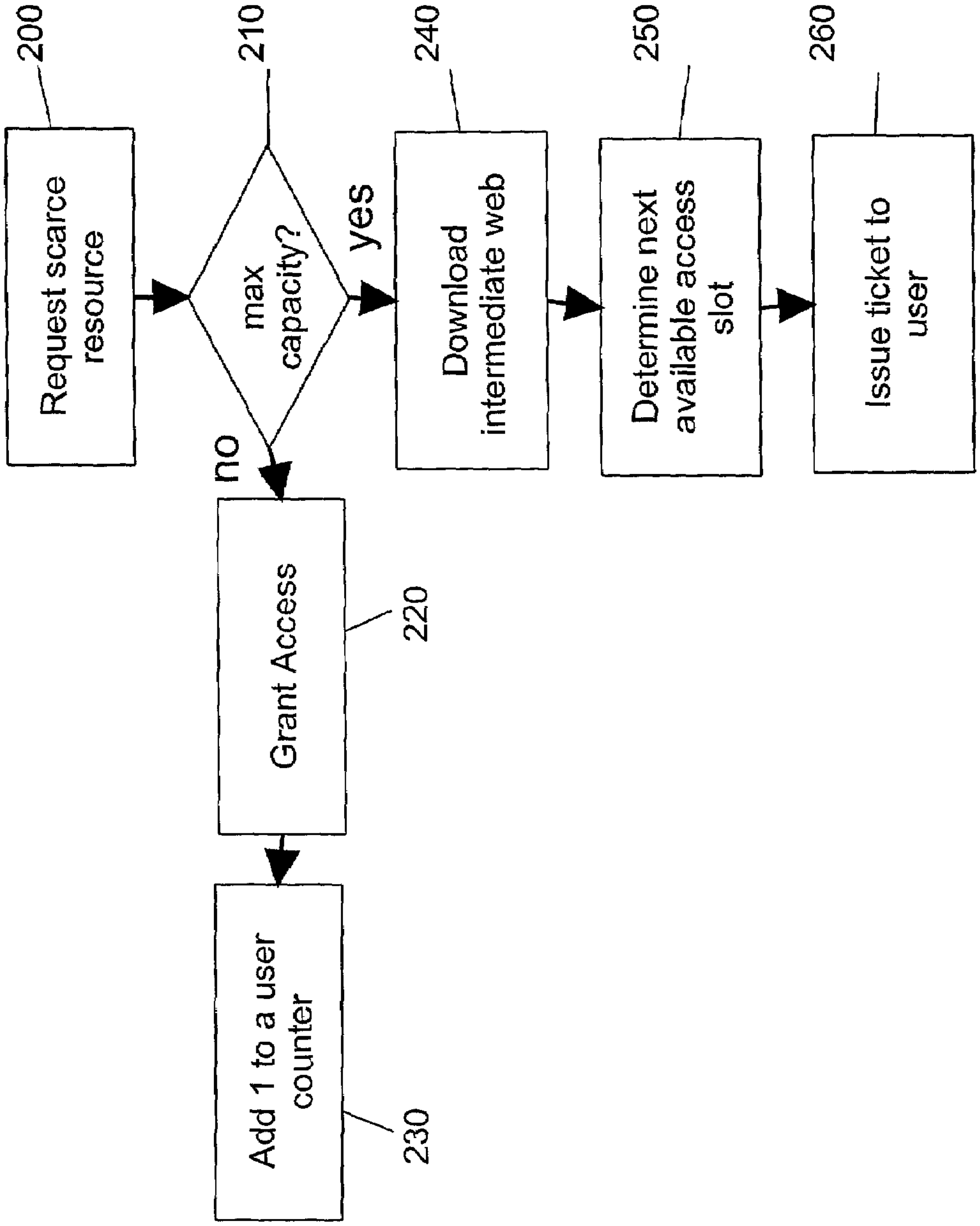
Figure 3B:
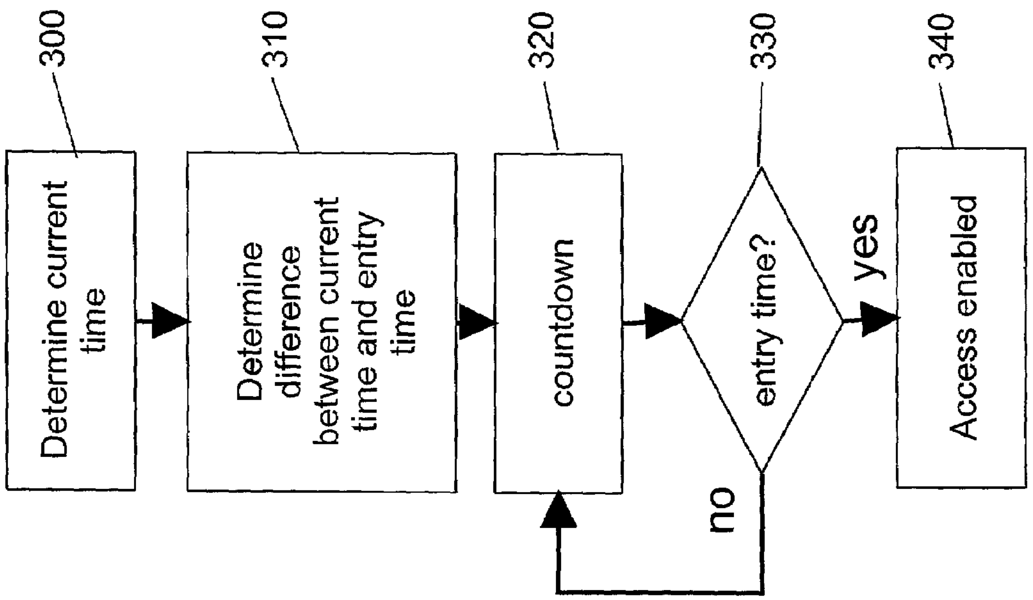
Figure 3C:
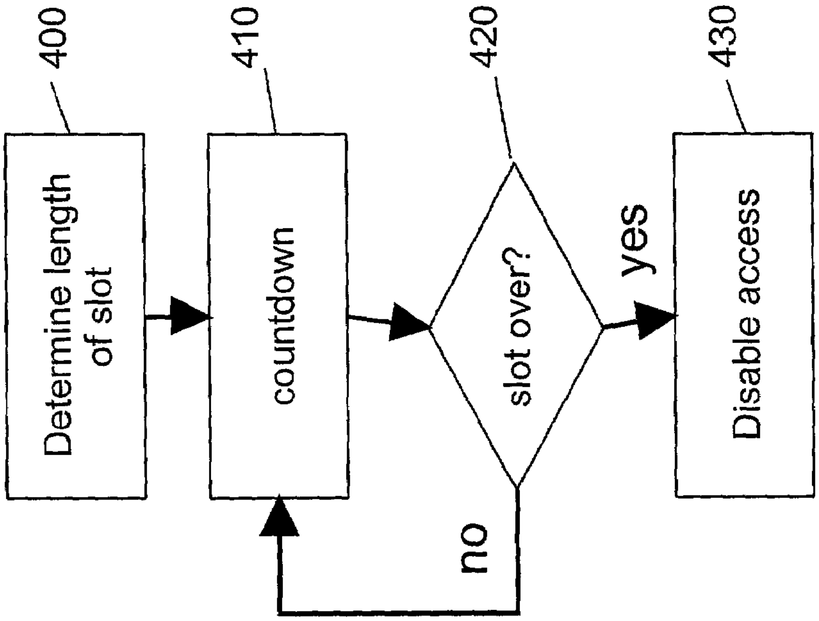

The front-end to an example scarce resource, in accordance with a preferred embodiment of the present invention, is shown in FIG. 1. Web page 10 is part of a shopping site hosted by a company, BettaBuy. The web page shows how a user has compiled a shopping basket 20 of food items. In order to process the transaction, the user presses the "proceed to checkout" button 30. In this example, the checkout is the scarce resource. Of course, the scarce resource could equally comprise the whole web site, not just a part thereof.

FIGS. 2, 3*a*, 3*b* and 3*c* illustrate web site access to a scarce resource (such as the checkout of FIG. 1) in accordance with a first embodiment of the present invention. Client 100 requests access to the scarce resource (web page 120) at step 200. The web page 120 resides on a server 110 and is requested by the client over the Internet 140.

At step 210 the server determines whether a desired maximum capacity access level for the scarce resource has been reached using max capacity component 150, which queries a user count 160. The user count keeps track of the number of people currently accessing the scarce resource. If the answer at step 210 is no, then access is granted to the scarce resource (step 220) and web page 120 is downloaded to the client (not shown). One is added to the user count 160 (step 230).

Conversely, if it is determined at step 210 that the server is at the desired maximum capacity for the scarce resource, then an intermediate web page 170 is downloaded from the server to the client 170' (step 240) and a Java applet 130 is instantiated 130' within the web page 170'. The intermediate web page informs the user that access is not currently available. The user is then issued with a ticket at step 260. The ticket contains a start time (denoting the earliest time that the user will be able to gain access to the scarce resource) and expiry time (at which access will typically be revoked). This provides the user with an specified time period during which they may access the resource. This information is preferably displayed to the user via the Java applet, along with the current time and the time remaining before access is enabled (see FIG. 4). Step 250 determines the next available access slot.

Note, the server 110 keeps track of the average access time via component 185 and uses this to determine the length of subsequently allocated slots. A current allocation slot component 167 determines which slot access is currently being allocated and monitors the number of users to whom that slot has been allocated. This ensures that once a desired maximum number of users have filled a certain slot, subsequent users can be allocated to a later slot.

In this embodiment, the user is provided with some form of entertainment whilst they wait for their access slot to arrive. This could be adverts (perhaps including a selection of the shop's promotional/special offers); online gaming etc. If the entertainment is processor; resource; memory; I/O etc. intensive then this is preferably located at a separate web server so as not to place undue load on the server hosting the scarce resource.

When the server returns the ticket including the user's allocated access slot to the user, the Java applet registers this information and determines the current time (step 300). Note, when the Java applet is instantiated on the client it preferably synchronises the client's system clock 105 with the server's system clock 165. This ensures that the Java applet re-requests access to the scarce resource at the appropriate moment.

At step 310 the Java applet determines the difference between the current time and the entry time defined by the user's ticket. The Java applet then begins to countdown the time remaining until access is enabled (step 320). When the countdown reaches zero (step 330), then access is enabled (step 340). Until such time, the countdown continues. Of course this is by way of example only. In an alternative embodiment, the current time is periodically compared with the start time in the user's ticket. When the current time is equal to, or later than the start time it is determined that the user's access slot has been enabled.

Once access is enabled for a particular user, the Java applet determines the length of the user's slot (step 400). This length will be apparent from the ticket issued to the user (i.e. the difference between the time at which the user accesses the resource and the expiry time defined by the ticket). The time remaining until the slot's expiry is then counted down (step 410) until the slot is deemed over (step 420). Access is then disabled (step 430). In other words the Java applet does not permit the user to continue accessing the scarce resource. Alternatively it is the server which receives the user's ticket with each access of the scarce resource and once their ticket has expired refuses the access. (Access does not have to be disabled at this point, see later for a discussion thereof.) In an alternative embodiment, the current time is periodically compared with the expiry time in the user's ticket. When the current time is equal to the expiry time the slot is over. Of course as the expiry time approaches, the client might want to switch to countdown mode so as not to miss the expiry time.

Of course immediately disabling access without any warning may prove inconvenient to the user. Thus in one embodiment, the Java applet provides the user with periodic warnings as the end of the slot approaches. In this way locking their access at slot expiry does not come as such a surprise. In one embodiment, the final warning informs the user that they should either process; save any transactions, or run the risk of losing their work. (The scarce resource preferably provides the user with the option to save their work.)

One advantage of using a Java applet is that client-side application programming reduces the perceived waiting time and encourages the user to wait patiently for the resource to become available (e.g. by displaying to the user their allocated slot; the current time; and a countdown of the time remaining till access is enabled for them). It also reduces network and server traffic, since the client will preferably not attempt any connection to the server until the time slot has started.

It will be appreciated whilst this first embodiment has been described of in terms of a Java applet, a javascript program; COM object program or other executable program may equally be used.

Further, not all clients (primitive clients) will have a system clock and will not therefore be capable of determining the current time. Thus in one embodiment, the server sends client tickets indicating the amount of time remaining before they can be granted access to a scarce resource. As long as the primitive clients are able to measure the passage of time reasonably accurately (e.g. by counting up/down), they will be able to determine when their access slot has arrived. The same method is also preferably used to determine when a user's access slot expires.

Also, since the internet is not country specific it cannot be guaranteed that the server and the client are set up for the same time zone. Thus it may be necessary to provide a ticket of the form:

Time Zone GMT +/−N (e.g. GMT −5)

(Alternatively it could be agreed that, for example, GMT will be used as the "universal timezone".)

Such a form would enable the server to perform the necessary calculations to determine the amount of time remaining before a client's access slot.

Alternatively, a ticket indicating only the amount of time remaining before access can be granted (i.e. of the form described with above with reference to primitive clients) would also overcome the problem of clients being in a different time zone to the server.

In another embodiment, upon requesting access to the scarce resource the client is asked to register their time zone (or the current time). A conversion program at the server (not shown) takes this into account when allocating a ticket.

Figure 5:
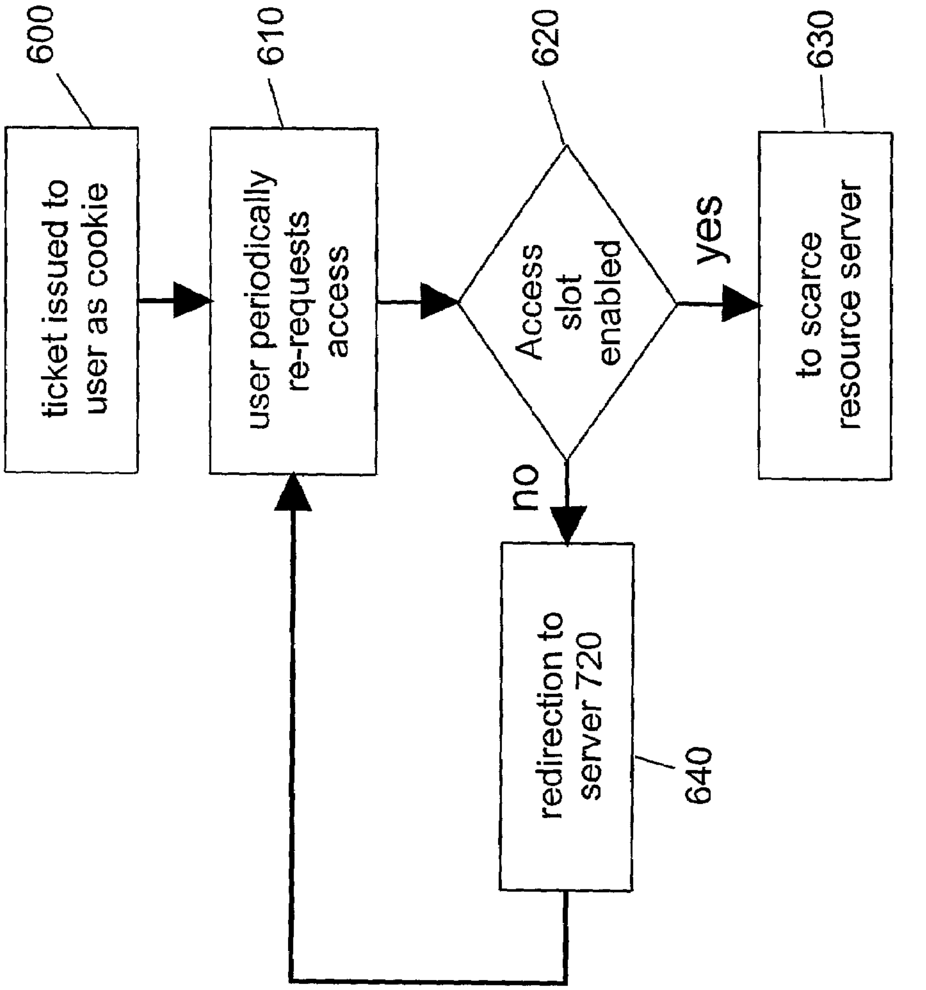
FIGS. 5 and 6 illustrate web site access to a scarce resource according to a second embodiment of the present invention.
Figure 6:
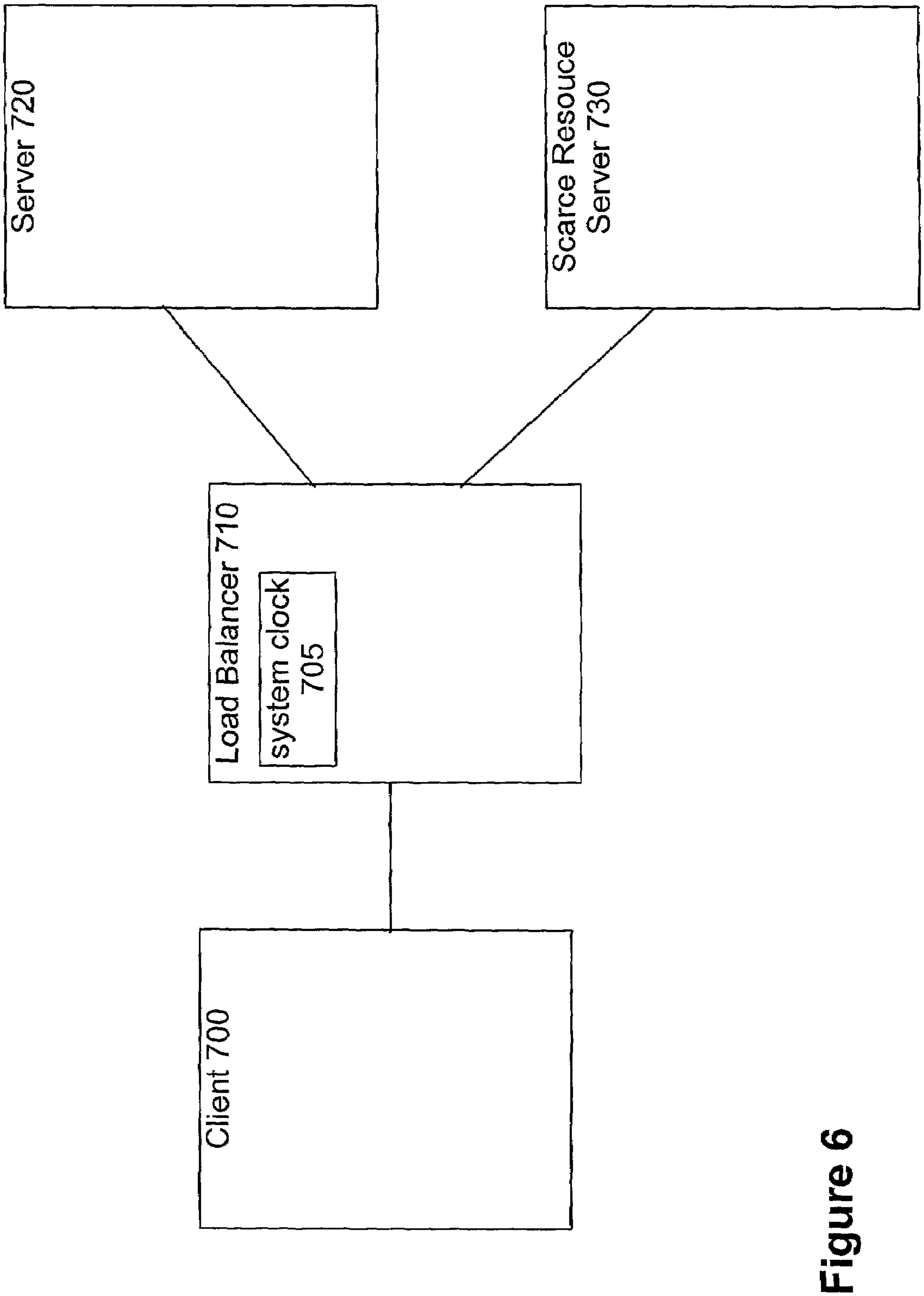

FIGS. 5 and 6 illustrate web site access to a scarce resource according to a second embodiment of the present invention. In this embodiment, a client attempts to connect to a server hosting a scarce resource. If it is determined that the server is already at a desired maximum access level for that resource, then a cookie is set which includes within it ticket information (step 600). This is stored on the client's hard drive.

Preferably this ticket information is as described with reference to the first embodiment. Every time the client attempts to connect to the same web site, it presents this cookie and this is examined to see whether access is yet available to the client. Until successful, the client makes such attempts at regular intervals (step 610). In one embodiment it does this by displaying a "Please click the reload button" message periodically to the user. In another embodiment, the web page from which the user can request access to the scarce resource contains a HTML client refresh tag. This tag forces a specified page (URL) to reload automatically every N seconds and takes the effort away from the user. It is of the form:

```
<META HTTP-EQUIV="REFRESH" CONTENT=N;
    URL=http://www.bettabuy.com/scarceresource.
    html">
```

In yet another embodiment, the web page from which access can be requested contains some javascript for achieving the automatic page refresh every N seconds. It will be appreciated that the above are examples only and the invention is in no way limited to such.

Numerous attempts to reload the page providing access to the scarce resource would impact the performance of the server hosting the scarce resource. Thus FIG. 7 depicts a solution in accordance with the second embodiment. Requests by client 700 are initially directed to a content-filtering load balancer 710 such as WebSphere Edge Server available from IBM Corporation.

The load balancer preferably has at least all the components of server 110 (FIG. 2), with the exception of the Java applet 130 and the web pages 120; 170. The load balancer is adapted to examine the cookie presented by the browser, and to have an awareness of the current time via system clock 705. When a request comes into the load balancer, a check is performed to see if the cookie that that the request presents contains a time range which brackets the current time (i.e. is the client's access slot enabled at step 620). If it does, the request is sent on to the scarce resource server 730 at step 630. If not, then the request is sent to a second server 720 at step 640. In one embodiment, this second server explains to the user that they are not able to access the scarce resource and provides entertainment of the form previously described with respect to the first embodiment. Further, the second server informs/reminds the client of their access slot and the time remaining before access is enabled. In another embodiment there is no entertainment—the client's request is rejected; they are informed of their access slot; and they are not able to access the resource until such time as that access slot is valid.

The client periodically rerequests access to the scarce resource and is redirected back to the second server until their ticket is ready to be served by the scarce resource server.

The advantage of this mechanism is that it can deal with a thin-client model where the client system does not have the apparatus or sophistication to actively prevent the user from attempting to access the scarce resource before the allotted time.

However, in one embodiment when a request for access to the scarce resource is first received, the page returned is modified by the load balancer 710 such that a re-request only occurs once access is enabled. For example, if it is determined that access will not be available for thirty minutes, the meta refresh tag or javascript is modified such that a subsequent re-request does not occur until those thirty minutes are at an end. The same may also be true if a prompt to refresh is displayed to the user.

Entertainment of the form described with reference to the first embodiment is preferably provided to the user whilst they wait for access to the scarce resource. In an embodiment where access is possible before the user's access slot is enabled, the entertainment is placed in one frame, whilst the refresh reloads a separate frame. This means that the user does not have to leave the entertainment only to be informed that the scarce resource server is still not ready for the user. Of course the user does not necessarily have to be directed to a separate server in order to receive the entertainment. However if that entertainment is processor; resource; memory; I/O etc. intensive, then this solution is preferable.

In one embodiment, no load balancer is used. Instead the user attempts to connect to an access URL. A servlet behind the access URL determines (using the cookie presented to it by the client) whether access can be granted. If the answer is no, then an intermediary web page is loaded informing the user of their access slot and providing them with some form of entertainment. On the other hand, if access can be granted, then the servlet redirects the client to the appropriate scarce resource URL.

It will be appreciated that the front-end to the scarce resource (e.g. the load balancer)/the server hosting the scarce resource is able to refuse access by the user at the appropriate moment. In the web environment, access to the scarce resource will typically be via a series of HTTP requests. Each request preferably presents the user's ticket including expiry information. Thus after the access slot has finished, a user's requests will no longer be valid.

In one embodiment, a combination of a cookie and a Java applet is used. When a user first attempts to connect to a scarce resource, a copy of the Java applet is instantiated on their machine. Java applets typically do not store any persistent state, in the sense that once a web page containing them is disconnected, the information gathered from a user session is lost. Thus if a user wishes to browse separate internet sites or disconnect from the internet completely, the information registered with a Java applet (i.e. a timed ticket) will be lost. Thus if the user wishes to leave the confines of the web site associated with the scarce resource behind, then the Java applet uses a cookie to register its access slot. The cookie is stored on the client's hard drive and the user may explore the rest of the web or even disconnect from the Internet completely. When the user attempts to reconnect to the scarce resource, the cookie is presented and compared with the access slot currently being served. Processing can then continue with step 620 of FIG. 6. Alternatively a Java applet is instantiated on the client. Rather than receive a ticket, the ticket stored in the cookie is registered with the Java applet and processing continues with step 300 of FIG. 3*b*.

In a further embodiment a separate application is downloaded to a client requesting access to a scarce resource. In this way the user is free to browse other parts of the web, whilst the application attempts to connect to the scarce resource in the background at the start of the allotted slot. In one embodiment, when access is finally granted a new browser session is launched and the scarce resource is then displayed therein to the user. This means that if the user is in the midst of, for example, a transaction at another web site this is not interrupted. Of is course, the scarce resource could be just as easily be displayed in the current browser session. In yet another embodiment, client-side notification is provided to the user that access is now available and they can attempt to connect at their leisure. Of course this runs the risk that the user will miss out on access (i.e. if their slot expires in the meantime) and may not be allowed in.

It will be appreciated that any combination of the embodiments described is also possible and also that the embodiments described are by way of example only.

It will be appreciated that it is possible for a client to miss its allocated access slot. Whether such users can be accommodated is dependent upon the amount of spare server capacity available. For example, whilst a server may already be at a desired maximum capacity for the scarce resource, the server may still be able to cope with one or two latecomers without the performance degradation being too great.

Further, with either embodiment it is not always be necessary to immediately disallow access once a user's allocated slot expires. The Java applet may request continued access, or the server (receiving one of a series of HTTP requests for accessing a part of the scarce resource) may determine that the client has not yet finished. In one embodiment, it is determined whether there is any spare capacity to accommodate continued access by the user. This could be determined by querying the current allocation slot component 167 to see whether the next access slot is under allocated. If it is, the user may be allocated a new ticket giving them continued access. If it is determined that a slot further into the future is currently being allocated, then this indicates that the next access slot is already full. In one embodiment the user is asked if they wish to reserve a place in the future slot. In another embodiment, it is determined whether, despite the next slot being full, there is the spare capacity to allow the user continued access. For example, the number of users typically allocated access is preferably a desired number only. In other words, the server is still able to provide a reasonable performance even with the odd additional user. It may be determined at the end of the access slot that more users wish to continue accessing the scarce resource, than there is spare capacity. In this instance, continued access may be granted to those users who were first allocated to their initial slot. In this embodiment, each user requiring access to the scarce resource is not only issued with a ticket, but also a ticket number. This number indicates the order of allocation for each slot.

It should also be noted that there may be a chain of scarce resources which a ticket provides access to. For example, the major supermarkets typically have a set of general informative web pages. There is then a link off one of these pages to an online shop. The main pages are likely not be particularly overburdened nor that processor; resource; memory; I/O etc. intensive. Thus access to these need not be ticketed. However, the shop may need to be via a ticket only. The shop may consist of two scarce resources: a shopping basket into which items may be added; and a checkout for processing of shop and payment. Navigation of the departments and creation of a shopping basket is likely to take much longer than the checkout stage. Thus in one embodiment, initial access by a client should preferably be within the access slot allocated to that client. However if it is determined at the expiry of their access slot that the client is at the checkout, then they may be allowed to finish their transaction during the next time slot window since such access will typically be quick and is also the part that the shop most wants the client to complete (the payment). Equally some of the resources in the chain may be more processor; resource; memory; I/O etc. intensive than others. Thus if the less processor; resource; memory; I/O etc. intensive resources are at the end of the chain, then clients accessing these may be allowed continued access even after their slot has expired. Careful monitoring is nevertheless required.

The server hosting the chain of scarce resources preferably keeps track of the interactions with the server to determine where a user is in the chain. For example, the server keeps track of the part of the scarce resource that the user is requesting. In one embodiment the typical access times for each resource in the chain is tracked. A stop watch component (not shown) starts running from the moment the client accesses a resource in the chain and is preferably reset every time the client accesses a new resource in the chain. In one embodiment, if a user is still adding to their shopping basket at the end of their allotted slot but it is probable that they are almost finished, they may be allowed continued access into the next time slot. It will be appreciated that a stored typical access time for the first resource may be used to determine where a user is in the chain (e.g. that a user is likely to have nearly finished adding items to their shopping basket). In one embodiment, the Java applet disconnects the user at slot expiry time. However, if requested to by the user the Java applet may ask the server whether disconnection is really necessary. The Java applet may even inform the server as to the stage which the user has reached.

In one embodiment, each client's ticket is marked (i.e. clipped) upon actual entry/access to the initial scarce resource. The client keeps a track of client interaction information (e.g. the amount of time spent accessing each resource in the chain/which resource the client is accessing etc.) and if they decide to leave the chain behind them (i.e. not to continue accessing the scarce resource/chain of resources), their ticket is presented to the server front-ending or hosting the scarce resource. This server stores all this information in a cookie for placing on the client's hard drive. Thus if the client returns to the scarce resource after their allotted slot has expired, this information can be used to determine where they were in the chain. If, for example, it is determined that they were near the end of the chain/only had resources to access which weren't particularly processor; resource; memory; I/O etc. intensive, then they may be allowed continued access outside of their allotted slot.

In another embodiment, an access slot only applies to one of the resources in the chain and any other resource in the chain is accessible whether or not the slot is enabled (valid). In one embodiment, each client's ticket is marked upon entry to the first resource and if they decide to leave before reaching the end of the chain of resources, they present their ticket to the server again. The server records on the ticket the point reached in the chain and this is then stored as a cookie on the client's hard drive. Thus clients may be able to return outside of their time slot if the resource they return to is not overburdened by other clients. (As previously mentioned, a client does not have to present their ticket before leaving the scarce resource. Alternatively the cookie may be updated after each interaction with the scarce resource.)

Moreover, whilst the term user has been used throughout, it will be appreciated that this should be taken as encompassing a client-side application.

Finally, it will be appreciated that whilst the invention has been described in terms of access to a scarce resource via a web interface, the invention is not limited to such. By way of example, it is relevant to access to any application in a client-server environment.

What is claimed is:

1. A method for regulating access by users to a scarce resource, the method comprising the steps of:

receiving a request for immediate access to the scarce resource;

determining, upon receipt of the request, whether the access level for said scarce resource is currently at a desired maximum, the desired maximum indicating a fixed predetermined maximum number of users, the desired maximum indicating a plurality of users and being independent of a maximum physical capacity for the scarce resource, that it is desired be simultaneously accessing the scarce resource;

responsive to determining that said access level is currently at a desired maximum, automatically allocating to a server determined access slot, which specifies a time period during which the scarce resource may be accessed, said requester;

providing said requester with a notification of their allocated access slot, access being available to said requester at any point in the time period during which said allocated slot is enabled;

receiving a late request for access to said scarce resource;

determining that said requester had been previously allocated to a slot and had missed the time period during which the allocated slot was enabled;

determining, upon receipt of the late request, whether the access level for said scarce resource is currently at a desired maximum;

responsive to determining that said access level is currently at a desired maximum, determining whether said scarce resource is able to accommodate immediate access by said late requester; and responsive to determining that it is possible to accommodate immediate access, granting immediate access to said requester.

2. The method of claim 1, wherein the step of providing said requester with a notification of their allocated access slot comprises:

issuing said requester with a ticket comprising access slot information, at least a part of said access slot information being used by said requester to determine when said allocated slot is enabled.

3. The method of claim 2, wherein said access slot information comprises a start time for said access slot and an expiry time for said access slot.

4. The method of claim 1, comprising the step of:

downloading onto said requester's computer an executable program for preventing said requester from attempting to access said scarce resource until said requester's access slot has been enabled.

5. The method of claim 1, comprising the step of:

responsive to said requester re-requesting access to said scarce resource, determining whether said access slot is enabled; and responsive to determining that said access slot is enabled, granting access.

6. The method of claim 5, wherein a re-request presents a ticket issued to the requester upon the first request, said ticket denoting an access slot information, said method further comprising the step of:

using said presented ticket to determine whether access is available to said requester.

7. The method of claim 5, wherein the step of granting access comprises:

diverting said requester to a first server hosting said scarce resource.

8. The method of claim 5, comprising the step of:

responsive to determining that access is not available, diverting said request to a second server, said second server providing the requester with entertainment whilst waiting for said access slot to be enabled.

9. The method of claim 1, comprising the step of:

providing said requester with entertainment whilst said requester is waiting for said access slot to be enabled.

10. The method of claim 1, wherein the step of determining whether said access level for said scarce resource is at a desired maximum consists of:

tracking the number of users currently accessing the scarce resource; and comparing said number with a predetermined maximum value.

11. The method of claim 1, comprising the steps of:

determining the average time spent accessing said scarce resource; and determining the length of subsequent access slots based on said average time.

12. The method of claim 1, wherein said scarce resource comprises a chain of resources.

13. The method of claim 12, wherein said access slot only applies to one of the resources in the chain and any other resource in said chain is accessible whether or not said slot is enabled.

14. The method of claim 1, comprising the steps of:

determining that said requester's slot is at an end; and refusing access to the scarce resource by said requester.

15. The method of claim 1, comprising:

determining that said requester is currently accessing said scarce resource and that said requester's access slot is at an end;

determining that said requester has not finished accessing said scarce resource;

determining, in response to a determination the said requester has not finished accessing said scarce resource, whether the access level for said scarce resource is currently at a desired maximum;

responsive to determining that said access level is currently at a desired maximum, determining whether said scarce resource is able to accommodate continued access by said requester; and responsive to determining that said requester is able to accommodate continued access, granting continued access to said requester.

16. The method of claim 1, comprising the steps of:

receiving a request for access to said scarce resource;

responsive to determining that said requester previously had access to the scarce resource and opted to leave said scarce resource early, determining whether the access level for said scarce resource is currently at a desired maximum;

responsive to determining that said access level is currently at a desired maximum, determining whether said scarce resource can re-accommodate immediate access by said requester; and responsive to determining that the scarce resource can re-accommodate immediate access, granting said requester with immediate access to said scarce resource.

17. An apparatus for regulating access by users to a scarce resource, the apparatus comprising:

a processor; and a memory, the memory including:

means for receiving a request for immediate access to the scarce resource;

means for determining, upon receipt of the request, whether the access level for said scarce resource is currently at a desired maximum, the desired maximum indicating a fixed predetermined maximum number of users, the desired maximum indicating a plurality of users and being independent of a maximum physical capacity for the scarce resource, that it is desired be simultaneously accessing the scarce resource;

means, responsive to determining that said access level is currently at a desired maximum, for automatically allocating to a server determined access slot, which specifies a time period during which the scarce resource may be accessed, said requester; and means for providing said requester with a notification of their allocated access slot, access being available to said requester at any point in the time period during which said allocated slot is enabled;

means for receiving a late request for access to said scarce resource;

means for determining that said requester had been previously allocated to a slot and had missed the time period during which the allocated slot was enabled;

means for determining, upon receipt of the late request, whether the access level for said scarce resource is currently at a desired maximum;

means for determining, responsive to determining that said access level is currently at a desired maximum, whether said scarce resource is able to accommodate immediate access by said late requester; and means, responsive to determining that it is possible to accommodate immediate access, for granting immediate access to said requester.

18. The apparatus of claim 17, wherein the means for providing said requester with a notification of their allocated access slot comprises:

means for issuing said requester with a ticket comprising access slot information, at least a part of said access slot information being used by said requester to determine when said allocated slot is enabled.

19. The apparatus of claim 18, wherein said access slot information comprises a start time for said access slot and an expiry time for said access slot.

20. The apparatus of claim 17, comprising:

means for downloading onto said requester's computer an executable program for preventing said requester from attempting to access said scarce resource until said requester's access slot has been enabled.

21. The apparatus of any of claims 17, comprising:

means, responsive to said requester re-requesting access to said scarce resource, for determining whether said access slot is enabled; and means, responsive to determining that said access slot is enabled, for granting access.

22. The apparatus of claim 21, wherein a re-request presents a ticket issued to the requester upon the first request, said ticket denoting an access slot information, said apparatus further comprising:

means for using said presented ticket to determine whether access is available to said requester.

23. The apparatus of claim 21, wherein the means for granting access comprises:

means for diverting said requester to a first server hosting said scarce resource.

24. The apparatus of claim 21, comprising:

means, responsive to determining that access is not available, for diverting said request to a second server, said second server providing the requester with entertainment whilst waiting for said access slot to be enabled.

25. The apparatus of claim 17, comprising:

means for providing said requester with entertainment whilst said requester is waiting for said access slot to be enabled.

26. The apparatus of claim 17, wherein the means for determining whether said access level for said scarce resource is at a desired maximum consists of:

means for tracking the number of users currently accessing the scarce resource; and means for comparing said number with a predetermined maximum value.

27. The apparatus of claim 17, comprising:

means for determining the average time spent accessing said scarce resource; and means for determining the length of subsequent access slots based on said average time.

28. The apparatus of claim 17, wherein said scarce resource comprises a chain of resources.

29. The apparatus of claim 28, wherein said access slot only applies to one of the resources in the chain and any other resource in said chain is accessible whether or not said slot is enabled.

30. The apparatus of claim 17, comprising the steps of:

means for determining that said requester's slot is at an end; and means for refusing access to the scarce resource by said requester.

31. The apparatus of claim 17, comprising:

means for determining that said requester is currently accessing said scarce resource and that said requester's access slot is at an end;

means for determining that said requester has not finished accessing said scarce resource;

means for determining, in response to a determination the said requester has not finished accessing said scarce resource, whether the access level for said scarce resource is currently at a desired maximum;

means for determining, responsive to determining that said access level is currently at a desired maximum, whether said scarce resource is able to accommodate continued access by said requester; and means, responsive to determining that said requester is able to accommodate continued access, for granting continued access to said requester.

32. The apparatus of claim 17, comprising:

means for receiving a request for access to said scarce resource;

means, responsive to determining that said requester previously had access to the scarce resource and opted to leave said scarce resource early, for determining whether the access level for said scarce resource is currently at a desired maximum;

means for determining, responsive to determining that said access level is currently at a desired maximum, whether said scarce resource can re-accommodate immediate access by said requester; and means, responsive to determining that the scarce resource can re-accommodate immediate access, for granting said requester with immediate access to said scarce resource.

33. A method for determining whether a user can be granted access to a scarce resource after an access slot allocated to said user has expired, the method comprising the steps of:

tracking at least one interaction by said user associated with said scarce resource;

determining that said requester had been previously been allocated to a slot and had missed the time period during which the allocated slot was enabled;

responsive to an interaction, comprising a request, by said user for access to said scarce resource after the allocated access slot has expired and a determination that said requester had been previously allocated to the expired allocated access slot, using at least one tracked interaction to determine whether the access level for said scarce resource is currently at a desired maximum, the desired maximum indicating a fixed predetermined maximum number of users, the desired maximum indicating a plurality of users and being independent of a maximum physical capacity for the scarce resource, that it is desired be simultaneously accessing the scarce resource;

responsive to determining that said access level is currently at a desired maximum, determining whether the scarce resource can accommodate immediate access by the user to the scarce resource; and responsive to determining that scarce resource can accommodate immediate access, granting said immediate access.

34. The method of claim 33, wherein the request for access is a request for continued access, said request being the only interaction tracked.

35. The method of claim 33, wherein said scarce resource comprises a chain of resources and wherein the step of using at least one tracked interaction to determine whether the scarce resource can accommodate immediate access by the user to the scarce resource comprises:

determining the point reached by said user in the chain.

36. An apparatus for determining whether a user can be granted access to a scarce resource after an access slot allocated to said user has expired, the apparatus comprising:

a processor; and a memory, the memory including:

means for tracking at least one interaction by said user associated with said scarce resource;

means, responsive to an interaction, comprising a request, by said user for access to said scarce resource after the allocated access slot has expired and a determination that said requester had been previously allocated to the expired allocated access slot, for using at least one tracked interaction to determine whether the access level for said scarce resource is currently at a desired maximum, the desired maximum indicating a fixed predetermined maximum number of users, the desired maximum indicating a plurality of users and being independent of a maximum physical capacity for the scarce resource, that it is desired be simultaneously accessing the scarce resource;

responsive to determining that said access level is currently at a desired maximum, determining whether the scarce resource can accommodate immediate access by the user to the scarce resource; and means, responsive to determining that scarce resource can accommodate immediate access, for granting said immediate access.

37. A computer readable medium having a computer program product stored thereon for determining whether a user can be granted access to a scarce resource after an access slot allocated to said user has expired, said program comprising program code adapted to perform the steps of:

tracking at least one interaction by said user associated with said scarce resource;

responsive to an interaction, comprising a request, by said user for access to said scarce resource after the allocated access slot has expired and a determination that said requester had been previously allocated to the expired allocated access slot, using at least one tracked interaction to determine whether the access level for said scarce resource is currently at a desired maximum, the desired maximum indicating a fixed predetermined maximum number of users, the desired maximum indicating a plurality of users and being independent of a maximum physical capacity for the scarce resource, that it is desired be simultaneously accessing the scarce resource;

responsive to determining that said access level is currently at a desired maximum, determining whether the scarce resource can accommodate immediate access by the user to the scarce resource; and responsive to determining that scarce resource can accommodate immediate access, granting said immediate access.

* * * * *

UNITED STATES PATENT AND TRADEMARK OFFICE

CERTIFICATE OF CORRECTION

PATENT NO. : 7,606,899 B2
APPLICATION NO. : 09/916792
DATED : October 20, 2009
INVENTOR(S) : Martin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this

Twelfth Day of October, 2010

David J. Kappos

David J. Kappos
*Director of the United States Patent and Trademark Office*